United States Patent [19]

Riehl, deceased et al.

[11] 3,710,093
[45] Jan. 9, 1973

[54] DEVICE FOR RAISING OR RETRACTING MOTOR VEHICLE HEADLAMPS

[75] Inventors: Wilhelm Riehl, deceased, late of Raunheim, Germany by Paula Riehl, executrix; Werner Karl Strobel, Wiesbaden, Germany

[73] Assignee: General Motors Corporation, Detroit, Mich.

[22] Filed: Sept. 8, 1970

[21] Appl. No.: 70,202

[30] Foreign Application Priority Data

Sept. 11, 1969 Germany.....................P 19 46 010.7

[52] U.S. Cl. ...............................................240/7.1 H
[51] Int. Cl. ...........................................B60q 1/06
[58] Field of Search ......................240/7.1 H, 7.1 R

[56] References Cited

UNITED STATES PATENTS

| | | | |
|---|---|---|---|
| 3,526,764 | 9/1970 | Klie et al. | 240/7.1 H |
| 3,387,125 | 6/1968 | Ingolia | 240/7.1 R |
| 2,084,120 | 6/1937 | Ames | 240/7.1 H |
| 2,369,295 | 2/1945 | Humer | 240/7.1 H |
| 3,325,636 | 6/1967 | Roberts, Jr. et al. | 240/7.1 H |
| 3,449,559 | 6/1969 | Licata et al. | 240/7.1 R |

*Primary Examiner*—Louis R. Prince
*Assistant Examiner*—Joseph W. Roskos
*Attorney*—J. L. Carpenter, E. J. Biskup and P. D. Sachtjen

[57] ABSTRACT

The invention relates to raising and retracting motor vehicle headlamps and includes an electrically operated spring biased interlock device for holding the headlamps raised or retracted and releasing them for movement from one position to the other.

1 Claim, 4 Drawing Figures

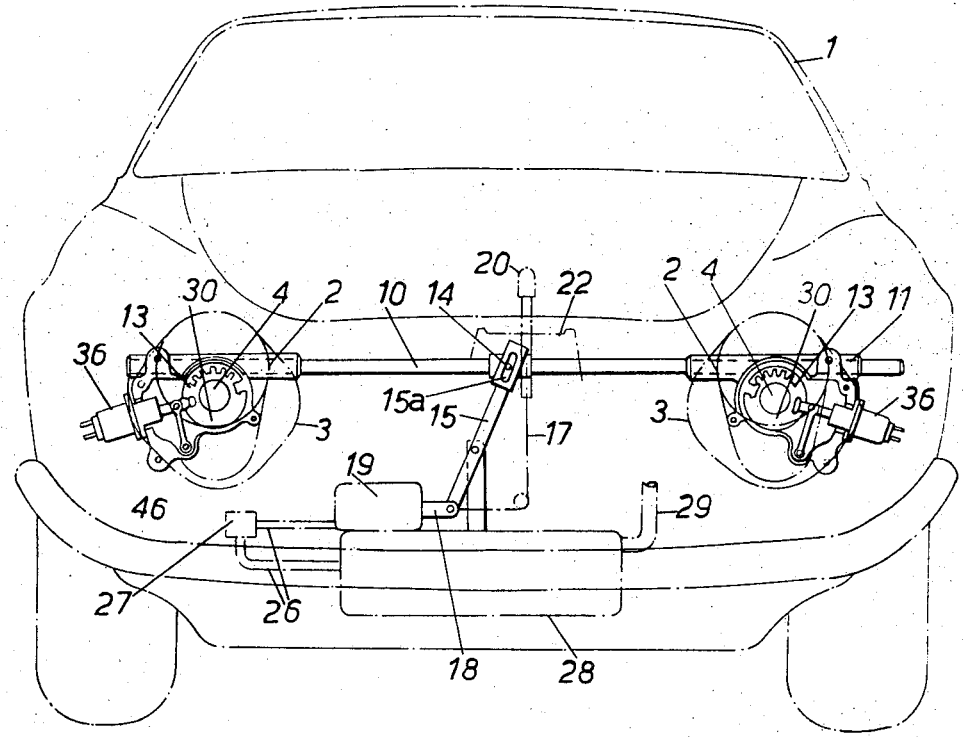
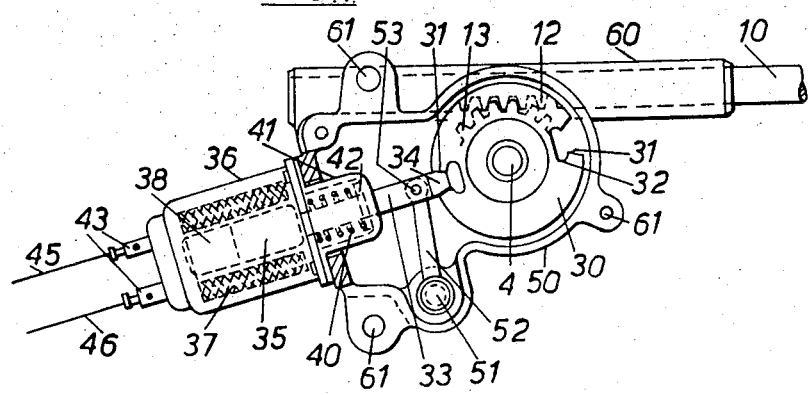

DEVICE FOR RAISING OR RETRACTING MOTOR VEHICLE HEADLAMPS

This invention relates to a device for raising or retracting motor vehicle headlamps which device has an electrically operated interlock to ensure that the headlamps are securely retained in their raised or retracted positions.

The scope of the monopoly is defined by the appended claims. How the invention can be performed is hereinafter particularly described with reference to the accompanying drawings in which:

FIG. 2 is a similar view to FIG. 1 but showing the headlamps raised;

FIG. 4 is a detail view partly in section, showing details of one interlock of a device according to the invention.

Figure 1:
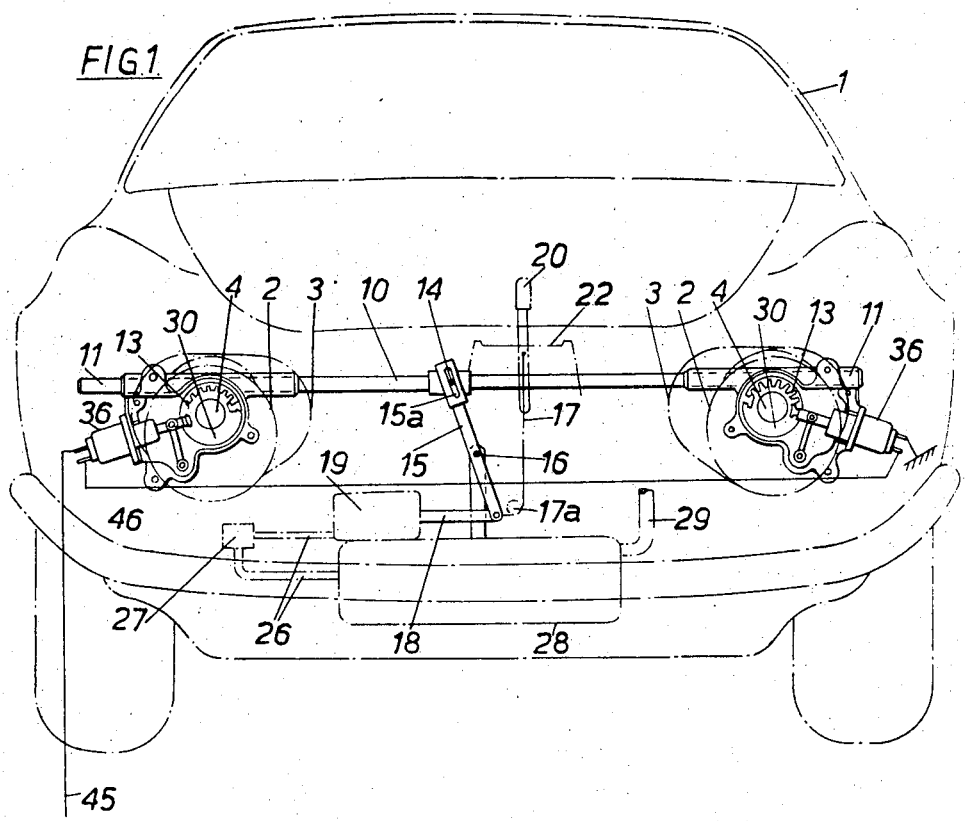
FIG. 1 shows a device according to the invention installed in a motor vehicle and with the vehicle headlamps retracted.
Figure 3:
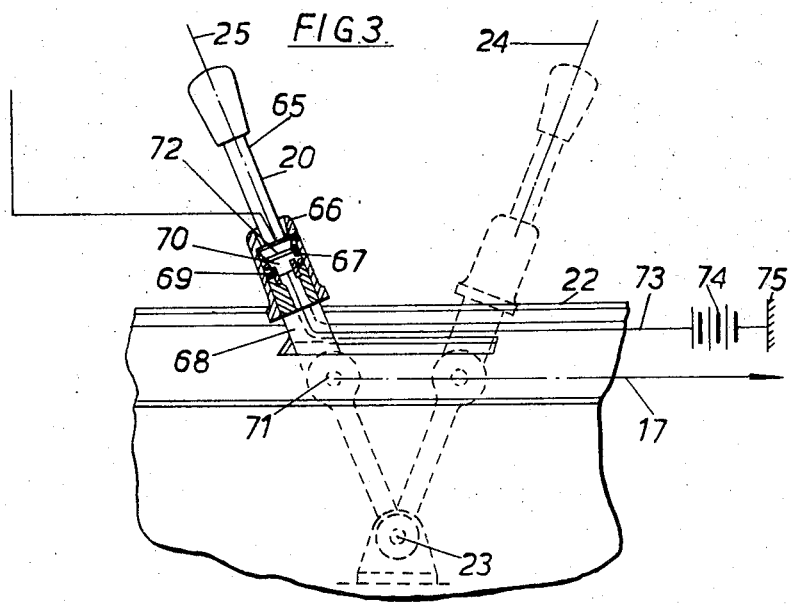
FIG. 3 is a detail view of part of a control for a device according to the invention.

FIGS. 1 and 2 show in dotted lines the outline of a motor vehicle body 1, viewed from the front of the vehicle. Two headlamps 2 are also shown in dotted lines, and these headlamps are each accommodated in respective ones of a pair of housings 3 mounted for rotation on respective shafts 4. The shafts 4 as will be later described, are mounted for rotation on housings on the vehicle body and are disposed longitudinally of the body adjacent respective side portions thereof. The headlamps are coupled together by a rod 10 which has a tooth rack portion 12 at each end, and these rack portions 12 each mesh with a toothed part 13 carried on the respective housing 3. The toothed parts 13 as shown in FIGS. 1, 2 and 4 are two pinions secured one on each shaft 4 and rotatable therewith. A pin 14 is fixed on the rod 10 at about the mid-point of the rod 10, as shown in FIGS. 1 and 2, and this pin engages a slot 15a in one end of a lever 15 pivotally mounted on the vehicle body at a point 16 midway along the length of the lever. The other end of the lever is connected by a cable 17 with a control 20 in the form of a hand lever pivotally mounted at 23 on an instrument console 22 of the vehicle as seen in FIG. 3. Alternatively, as shown also in FIGS. 1 and 2, the other end of the lever 15 could be connected by a rigid link 18 to a vacuum motor 19, connected by piping 26 and a control valve 27 to a vacuum vessel 28 which is connected by piping 29 to the induction manifold of the vehicle engine (not shown).

Movement of the lever 15 causes movement of the rod 10 and rotation of the headlamp housings 13. The rod 10, pin 14 slot 15a and lever 15 constitute a linkage movable in response to actuation of the control 20.

On each shaft 4 there is fixedly mounted a disc 30 having two diametrically opposed peripheral recesses 31, and each recess as best seen in FIG. 4 narrows inwardly from the periphery of the disc and then opens out into a slot 32 at the base of the recess. FIG. 4 also shows a plunger 33 having a tapered free end portion 34 engaged in one of the recesses 31 of the disc 30. The plunger is secured at its other end to an armature member 35 of an electromagnet 36 having a coil member 37 with a bore 38 therethrough for reception of the armature member 35. The plunger 33 extends through a housing 41 in which the coil member 37 is secured. The housing 41 contains a coil compression spring 40 mounted on the plunger 33. One end of the spring 40 bears against a collar 42 fixed on the plunger 33 and the other end of the spring bears against the coil member 37. Mounted on the housing 41 are terminals 43 for respective electric leads 45 and 46 for energizing the electromagnet 36. The electromagnet 36 or its housing 41 is carried by a further housing 50 having apertured lugs 61 for attachment of the housing to the vehicle body. The housing 50 has an aperture for reception of the shaft 4 of its associated headlamp, and also has a tubular guide portion 60 in which one toothed end 12 of the rod 10 is slidably received and held thereby in meshing engagement with the toothed part 13 of the disc 30.

The housing 50 carries a pivot pin 51 on which is pivotally mounted a rigid link 52 at one end thereof, and at its other end the link is pivotally connected to the plunger 33 adjacent the free end of the plunger which engages in the recess 31. The link 52 guides the plunger in its movement into or out of the recess 31.

The assembly of the electromagnet 36, the plunger 33, the spring 40, the disc 30, and the guide 60 into one housing 50 constituting one component provides a compact and easily handled unit. Although only one unit has been described there are as shown two such units, one for each headlamp. The control 20, as best seen in FIG. 3, has a handle 65 pivotally mounted at one end in a bush 66 and the handle is urged into a set position by a spring 67 mounted in the bush 66 and bearing on the end of the handle 65. The bush 66 is screwed into the free end of a lever 68 which is pivotally mounted at its other end to the instrument console 22 at the pivot point 23. A contact plate 70 and an insulator 69 are disposed in the free end of the lever 68 adjacent the bush 66. The cable 17 is connected to the lever 68 at a point 71 approximately midway along the length of the lever. A contact plate 72 is secured on one end of the handle 65 which is pivotally mounted in the bush 66. The contact plate 70 is connected by a lead 73 to a battery 74 which in turn is connected to earth at 75. The contact plate 72 is connected through a lead 45 with one electromagnet 36, which in turn is connected by a lead 46 with the other electromagnet 36 for the other headlamp, and this electromagnet is earthed.

In operation, the control 20 is operated by moving the lever 65 and through it the lever 68 from the full line position 25 to the dotted line position 24 of FIG. 3, to raise the headlamps. Initial movement of the lever 65 causes it to bend against the force of the spring 67 and closes the contact plates 70, 72 to complete the circuit through the electromagnets 36 which are energized and retract the plungers 33 from engagement in the recesses 31 of the respective discs 30 against the force of the spring 40, thus freeing the headlamps for rotation to the raised position. Further movement of the lever 65 towards position 24 causes the lever 68 to move and so move the cable 17 which in turn moves the lever 15 and so through the pin and slot connexion with the rod 10 causes the rod to move and the toothed end portions 12 of the rod rotate the discs 30 and raise the headlamps. Upon release of the lever 65 it is urged by the spring 67 into its set position with respect to the bush 66, the contact plates 70, 72 are moved apart thus breaking the electric circuit to de-energize the electromagnets, whereupon the springs 40 urge the plungers 33 outwardly into engagement with the other recesses 31 of the discs 30 to retain the headlamps in the raised position.

If, as also shown in FIGS. 1 and 2, the rod 10 is operated by the vacuum motor 19 a valve 27 is operable by movement of the control 20 to operate the vacuum motor 19, and also the electric circuit for the electromagnets is energized. Operation of the control 20 whether by manual or electrical or mechanical means first completes the electric circuit for the electromagnets before moving the rod 10.

Once the headlamps have been raised into position, further movement of the control, in the opposite direction, from position 25 to position 24 will energize the circuit to actuate the electromagnets 36 to move the plungers 33 against the bias or force of the springs 40, thus releasing the housings for movement to the retracted position.

The electromagnets 36, the plungers 33, and the discs 30 constitute a simple and reliable interlock for ensuring positive retention of the headlamps in the raised or retracted position.

We claim:

1. In combination with a motor vehicle body; two headlamp housings rotatably mounted on the body; a linkage operable to rotate said housings; a first lever pivotally mounted interior of the body and operatively connected to said linkage to rotate said housing upon movement thereof from a first position to a second position; a solenoid associated with each housing and operable to lock the latter against rotation when deenergized and unlock the housing for rotation when energized; a second lever limitedly pivotally connected to said first lever; normally open contact means carried by said levers, said contact means being closed during movement of said second lever and said first lever; electrical circuit means between said solenoids and said contact means for energizing the former when said contact means are closed whereby movement of said first lever between said positions closes said contact means to energize said solenoids and unlock said housings to permit rotation movement thereof in accordance with movement of said linkage, said contact means opening upon release of said second lever to deenergize said solenoids and lock said housings.

* * * * *